(12) United States Patent
Kelley et al.

(10) Patent No.: US 10,719,116 B2
(45) Date of Patent: Jul. 21, 2020

(54) INTELLIGENT DISPLAY ON/OFF SWITCHING FOR ELECTRONIC DEVICE DISPLAYS

(71) Applicant: INTERNATIONAL BUSINESS MACHINES CORPORATION, Armonk, NY (US)

(72) Inventors: John F. Kelley, Polk City, FL (US); Michael Bender, Rye Brook, NY (US); Todd P. Seager, Orem, UT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

(21) Appl. No.: 16/023,660

(22) Filed: Jun. 29, 2018

(65) Prior Publication Data

US 2020/0004313 A1    Jan. 2, 2020

(51) Int. Cl.
| G06F 3/0346 | (2013.01) |
| G06F 16/23 | (2019.01) |
| G06F 1/16 | (2006.01) |
| G06F 1/3231 | (2019.01) |
| G09G 5/00 | (2006.01) |
| G06F 3/01 | (2006.01) |

(Continued)

(52) U.S. Cl.
CPC ........... *G06F 1/3231* (2013.01); *G04G 21/02* (2013.01); *G06F 1/3287* (2013.01); *G06F 3/013* (2013.01); *G06F 3/017* (2013.01); *G06F 3/0346* (2013.01); *G06F 16/2379* (2019.01); *G09G 5/003* (2013.01); *G06F 1/163* (2013.01); *G09G 2330/022* (2013.01); *G09G 2330/023* (2013.01); *G09G 2330/027* (2013.01); *G09G 2354/00* (2013.01)

(58) Field of Classification Search
CPC ....... G04G 21/02; G06F 1/163; G06F 1/3231; G06F 1/3287; G06F 3/013; G06F 3/017; G06F 3/0346; G06F 16/2379; G09G 5/003; G09G 2330/022; G09G 2330/023; G09G 2330/027; G09G 2354/00
See application file for complete search history.

(56) References Cited

U.S. PATENT DOCUMENTS 5,504,907 A * 4/1996 Stewart ................. G06F 1/3203
                                                713/321
8,988,349 B2   3/2015 Alberth et al.
9,679,538 B2   6/2017 Holmanu
(Continued)

*Primary Examiner* — Mihir K Rayan
(74) *Attorney, Agent, or Firm* — Tutunjian & Bitetto, P.C.; Michael Petrocelli

(57) ABSTRACT

A method of controlling the display of an electronic devices that includes measuring a motion of a device; and determining if the motion of the device and the display state of the device at the time of motion match conditions in a database of motions that are correlated to display states that signal a change from the display state at the time of the motion to a called display state. The method may further include adjusting power from a battery to the display to effectuate a change of display state in response to motion of the device matching conditions in the database of motions that signal the change of display state or a user intervention signaling a change in display state. The method further includes updating a database of motions in response to changes in the display state effectuated by user intervention.

20 Claims, 10 Drawing Sheets

(51) Int. Cl.
    *G04G 21/02*     (2010.01)
    *G06F 1/3287*    (2019.01)

(56) References Cited

U.S. PATENT DOCUMENTS

| | | | |
|---|---|---|---|
| 9,864,955 B2 | 1/2018 | Faaborg et al. | |
| 10,386,911 B2* | 8/2019 | Duale | G06F 11/3055 |
| 2008/0165116 A1* | 7/2008 | Herz | G09G 3/3406 |
| | | | 345/102 |
| 2009/0082066 A1* | 3/2009 | Katz | G06F 1/3203 |
| | | | 455/566 |
| 2010/0313050 A1* | 12/2010 | Harrat | G06F 1/3203 |
| | | | 713/323 |
| 2011/0169726 A1* | 7/2011 | Holmdahl | G06F 3/017 |
| | | | 345/156 |
| 2014/0101472 A1* | 4/2014 | Rohrweck | G06F 1/3265 |
| | | | 713/323 |
| 2014/0247208 A1* | 9/2014 | Henderek | G06F 3/0481 |
| | | | 345/156 |
| 2014/0269223 A1* | 9/2014 | Mokhnatkina | G04G 13/02 |
| | | | 368/73 |
| 2015/0177841 A1* | 6/2015 | VanBlon | G06F 3/017 |
| | | | 715/863 |
| 2015/0348511 A1* | 12/2015 | Oriol | G06F 3/01 |
| | | | 345/212 |

* cited by examiner

INTELLIGENT DISPLAY ON/OFF SWITCHING FOR ELECTRONIC DEVICE DISPLAYS

BACKGROUND

Technical Field

The present invention generally relates to electronic devices including displays, and more particularly to methods of powering and depowering the display of electronic devices in response to user interaction.

Description of the Related Art

Battery life is a serious problem for smartwatches with backlit displays. There are various solutions for turning the display on when it is surmised that the user might be wanting to look at the watch (like when a button is pressed or watch movement indicates that it is being brought up to a viewing position), but the watch movement profiles are static and there is no consideration of how long the display should remain lit. The common solution to the latter problem is to just keep the display on for a fixed amount of time (like 10 seconds). This is probably fine if the use is simply wanting to know what time it is at a glance, but is a frustration for users who may need to ponder the display for a longer period of time.

SUMMARY

In accordance with an embodiment of the present disclosure, a method for controlling on and off switching for the display of wearable and/or mobile electronic devices is provided. In one embodiment, the method includes controlling the display state of electronic devices that includes providing a database of motions that are correlated to display states. The motion of the electronic device is then measured, in which the device includes a display and a selectable button for activating display independent of motion status. The display state of the device may also be determined at the time of the motion. In a following step, the method can continue with determining if the motion of the device and the display state of the device at the time of motion match conditions in the database of motions that are correlated to display states that signal a change from the display state at the time of the motion to a called display state. The power from a battery of the electronic display can then be adjusted to effectuate a change of display state in response to the motion of the device and the display state of the device at the time of the motion matches conditions in the database of motions that signal the change of display state, or a display state change requested by activation of the selectable button. In a following step, the method can continue with updating the database of motions in response to changes in the display state when effectuated by the activation of the selectable button.

In another aspect, a system for controlling on and off switching for the display of wearable and/or mobile electronic devices is provided. In one embodiment, the system for controlling the display state of the electronic device includes a database of motions that are correlated to display states of an electronic device, and a motion measuring sensor for measuring motion of the electronic device including the display. The system may further include a display setting recorder for determining a display state of the electronic device at the time of the motion; and a motion analyzer for determining if the motion of the device and the display state of the device at the time of motion match conditions in the database of motions that are correlated to display states that signal a change from the display state at the time of the motion to a called display state. In some embodiments, the system further includes a display override actuator for signaling a display state change requested by activation of a selectable button on the electronic device, as well as a time out actuator for signaling end of time period for display state change requests. A power adjuster may be present for adjusting power to the display to effectuate a change of display state in response to a signal received from the motion analyzer indicating the motion of the device and the display state of the device at the time of the motion matches conditions in the database of motions that signal the change of display state, the display override actuator indicating a display state change requested by activation of the selectable button, or the time out actuator indicating termination of a time period for changes in display state. The system can also include an update module for updating the database of motions in response to changes in the display state effectuated by the activation of the selectable button.

In yet another aspect, a wearable device is provided that measures motions applied to the wearable device and correlates those motions to gestures for activating and deactivating display states. In one embodiment, the wearable device may include a display screen having at least two display states, a power source for powering the display screen to effectuate change between the at least two display states, and a motion sensor for measuring motion of the wearable device. The wearable device can also include a communications module for accessing a database of motions that are correlated to display states of an electronic device, and a motion analyzer for comparing the motion of the wearable device to the database of that are correlated to a display state of the display screen the electronic device that the time of the motion measured by the motion sensor. A driver for adjusting power from the power source to the display can effectuate a change of display state in response to a signal received from the motion analyzer indicating the motion of the device and the display state of the device at the time of the motion matches conditions in the database of motions that signal the change of display state. The wearable device may also include a display override indicating a display state change requested by activation of the selectable button in response to a user specific motion that does not correspond to the conditions in the database of motions that signal the change of display state, wherein the display override updates the database to include the motion correlated to the user via the communications module.

In yet another embodiment, a computer program product is provided for controlling on and off switching for the display of wearable and/or mobile electronic devices. In one embodiment, the computer program product comprises a computer readable storage medium having program instructions embodied therewith, the program instructions being executable by a computer to cause the computer to perform a method that includes controlling the display state of electronic devices that includes providing a database of motions that are correlated to display states. The motion of the electronic device is then measured, in which the device includes a display and a selectable button for activating display independent of motion status. The display state of the device may also be determined at the time of the motion. In a following step, the method can continue with determining if the motion of the device and the display state of the device at the time of motion match conditions in the database of motions that are correlated to display states that signal a change from the display state at the time of the motion to a called display state. The power from a battery of the electronic display can then be adjusted to effectuate a change of display state in response to a condition selected from the group consisting of the motion of the device and the display state of the device at the time of the motion matches conditions in the database of motions that signal the change of display state, a display state change requested by activation of the selectable button, and termination of a time period for changes in display state. In a following step, the method can continue with updating the database of motions in response to changes in the display state when effectuated by the activation of the selectable button. The computer readable storage medium may be non-transitory.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 1 is a flow diagram showing one embodiment of a method for controlling ON switching for the display of wearable and/or mobile electronic devices that includes measuring the motion of the device to determine whether the motions are recognized gestures from a database of ON motions for turning the device ON, and an button override for turning the display on in response to a motion that is not a recognized gesture from the database, wherein use of the button override also updates the database to include the motion as a gesture for turning the display ON.

DETAILED DESCRIPTION

Figure 1:
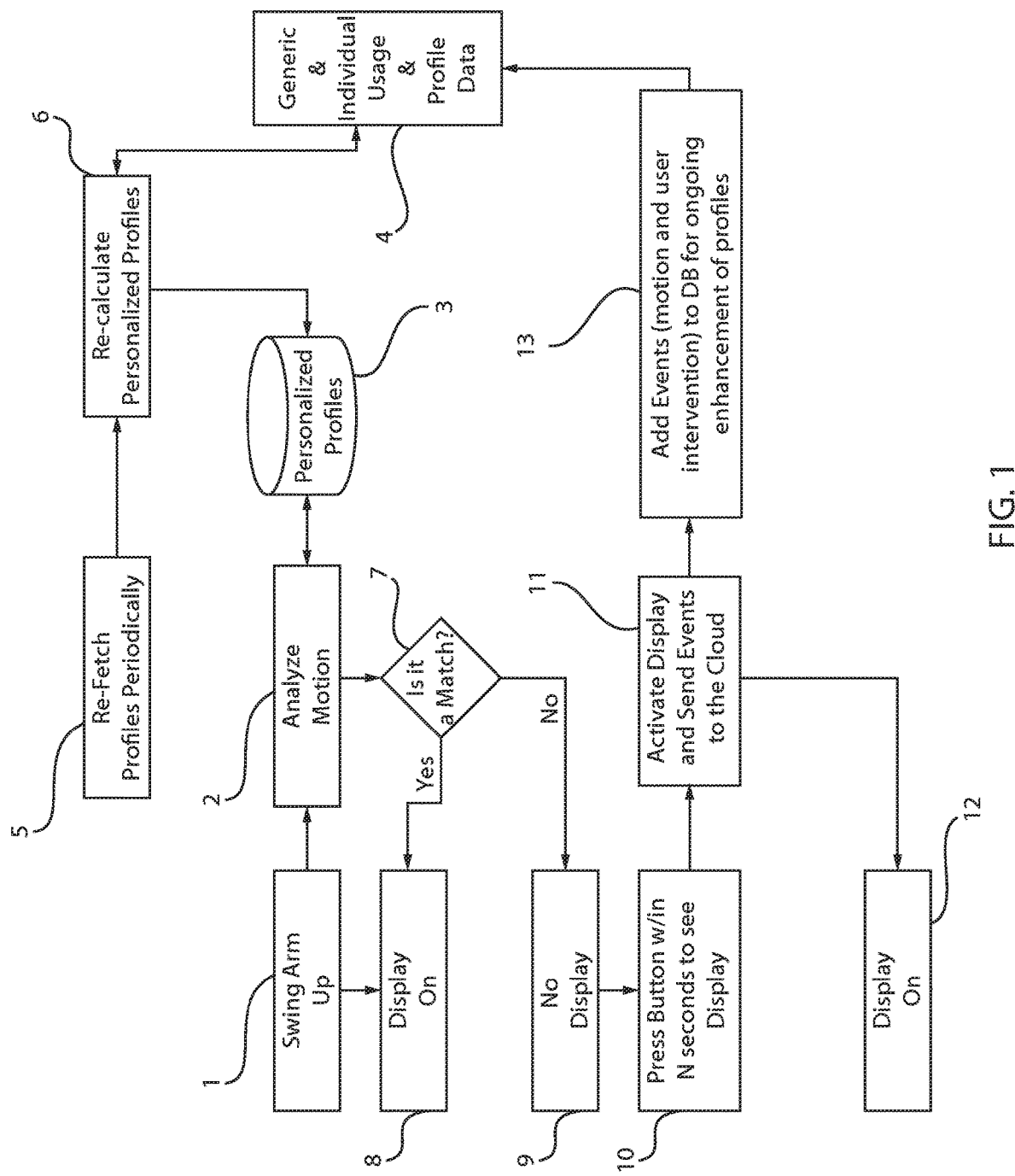

The methods, systems, apparatus and computer program products described herein relate to the ON/OFF switching for displays for wearable devices and/or mobile devices. In many instances, methods for controlling displays on wearable and/or mobile devices are particularly problematic. For example, in some instances, in which motions of the device are employed to signal changes in display states the preprogrammed gestures and algorithms used to effectuate display changes are inconsistent, not tailored to the specific user employing the device, and include arbitrary display periods. For example, a preset ten (10) second (sec) display period is not sufficient for all cases of display use. In some embodiments, the methods, systems, apparatus and computer program products of the present disclosure employ data and cloud computing to refine and personalized the algorithm for turning on the display, as well as turning the display off. For some use cases, it has been determined that the gesture of lifting, i.e., an upward motion away from the floor, of a wearable and/or mobile device, such as smartwatch, towards the eyes of the user will turn on the display, but a fixed time (e.g. 10 seconds) is not appropriate for turning it off. For example, a fixed time period, such as a ten second interval, may not be suitable if the user wishes to ponder the analog watch display and plan out their day. In another example, a fixed time period, such as a ten second interval, may not be suitable for mobile devices/wearable devices including displays having additional fitness statistics that the user may wish to examine at their leisure.

In some embodiments, the methods, systems, apparatus and computer program products use the built-in, accelerometer-based gesture recognition to determine when the wearable/mobile device has been moved away from the eyes and only then turn OFF the display. The algorithms employed in the present disclosure can be tuned with cloud-based analytics that are "trained" by looking for user interventions in the usage data (where the display switching is caused by the user pressing a button, establishment of eye contact, or using a voice command within some short period of time). In addition, the methods, systems, apparatus and computer program products described herein allow a user to train their mobile/wearable device as to other positions where they desire the display to be turned on.

The methods, systems, apparatus and computer program products are now described with greater detail with reference to FIGS. 1-9. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIGS. 1-4 are flow diagrams illustrating embodiments for controlling the display state of electronic devices, i.e., mobile devices and/or wearable devices. Each of the embodiments described with reference to FIGS. 1-4 employ a database of motions that are correlated to display states. A "display state" can be whether the electronic device, i.e., mobile devices and/or wearable devices, has a display that is powered ON, and therefore displaying an image in its screen, or a display that is powered OFF, and therefore not displaying an image on its screen.

Although some embodiments of the wearable devices and/or mobile devices employed in the methods, systems, apparatus, and computer products of the present disclosure may be described herein as a time piece, such as a wrist watch, i.e., a watch temporarily affixed to a user's wrist by a band, the present disclosure is not limited to only this type of mobile electronic device. For example, any device including a display and computing capabilities may be employed for the use with the methods and structures described herein, and it is not necessary that the device include a time keeping function. The device may include sensors to monitor biological functions of the user. The device may include communication modules to display media to the user, as well as news updates, social media updates. The device may have smartphone capability, as well as e-mail capability, and/or other communication capabilities. In some embodiments, the display of the wearable/mobile electronic device is powered by a battery power source.

In each of the aforementioned methods, a motion is being measured. This can be provided by a motion sensor that is present in the mobile and/or electronic device. The motion sensor may be an accelerometer, gyroscopic sensor, 3-dimensional (3D) depth sensor, gravity sensor and/or any other suitable sensor to, for example, implement the techniques variously described herein.

Figure 2:
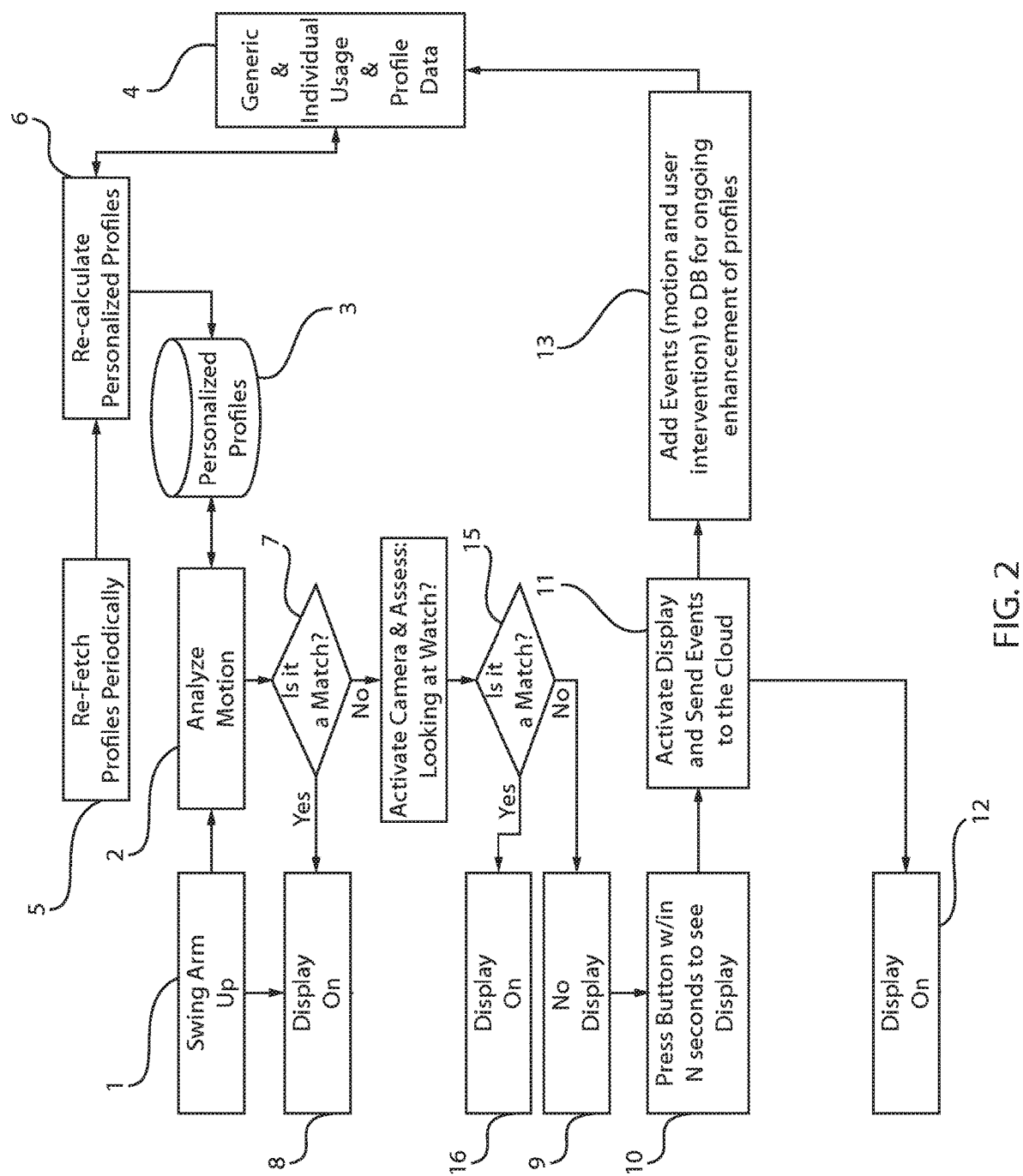
FIG. 2 is a flow diagram is a block/flow diagram showing another embodiment of a method for controlling ON switching for the display of wearable and/or mobile electronic devices that includes measuring the motion of the device to determine whether the motions are recognized gestures from a database of ON motions for turning the display ON, and an override including both a selectable button and a camera for detecting user eye contact for turning the display on in response to a motion that is not a recognized gesture from the database.
Figure 3:
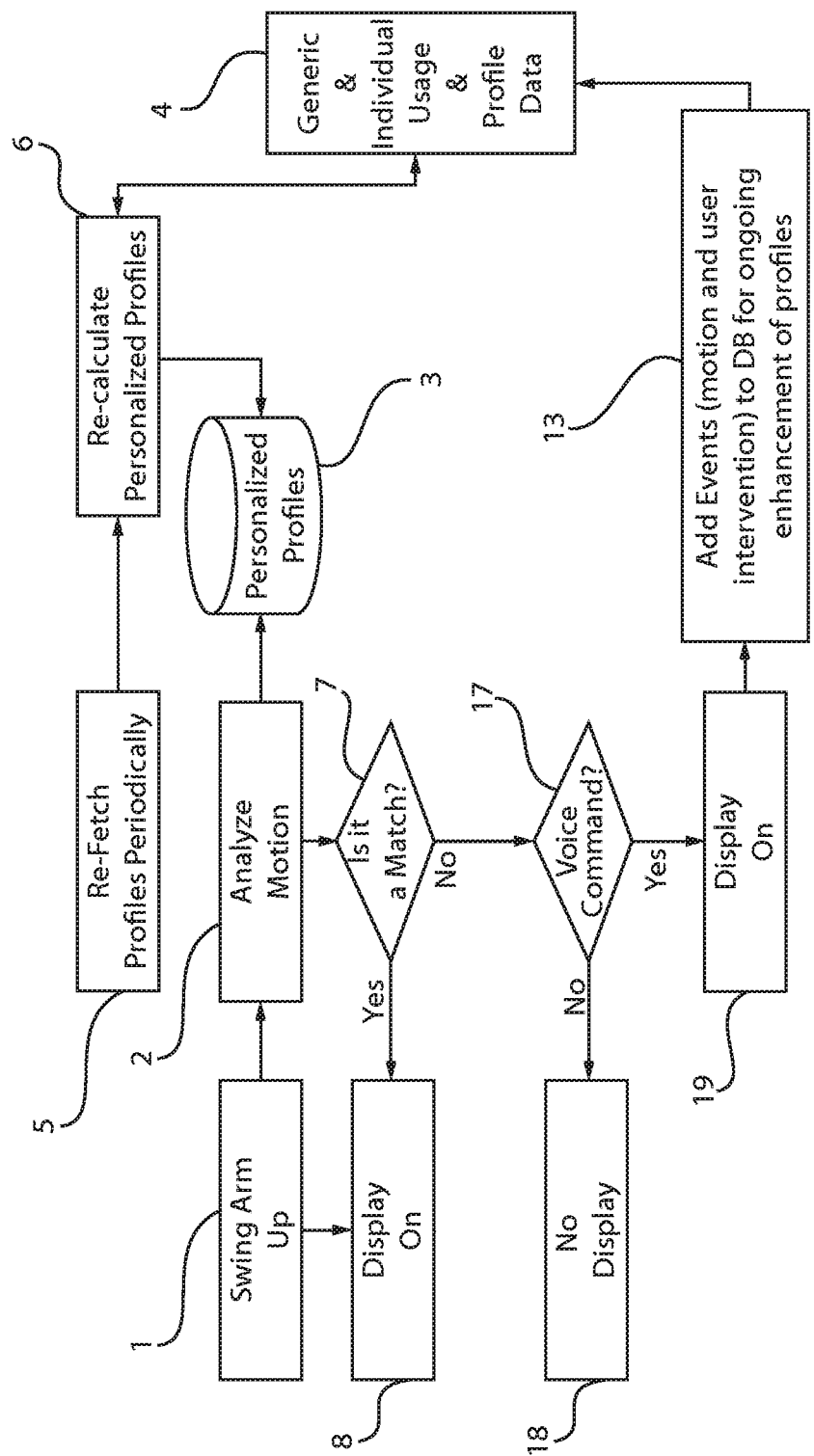
FIG. 3 is a flow diagram showing another embodiment of a method for controlling ON switching for the display of wearable and/or mobile electronic devices that includes measuring the motion of the device to determine whether the motions are recognized gestures from a database of ON motions for turning the display ON, and an override including both a selectable button and a microphone for detecting user voice intervention for turning the display on in response to a motion that is not a recognized gesture from the database.
Figure 4:
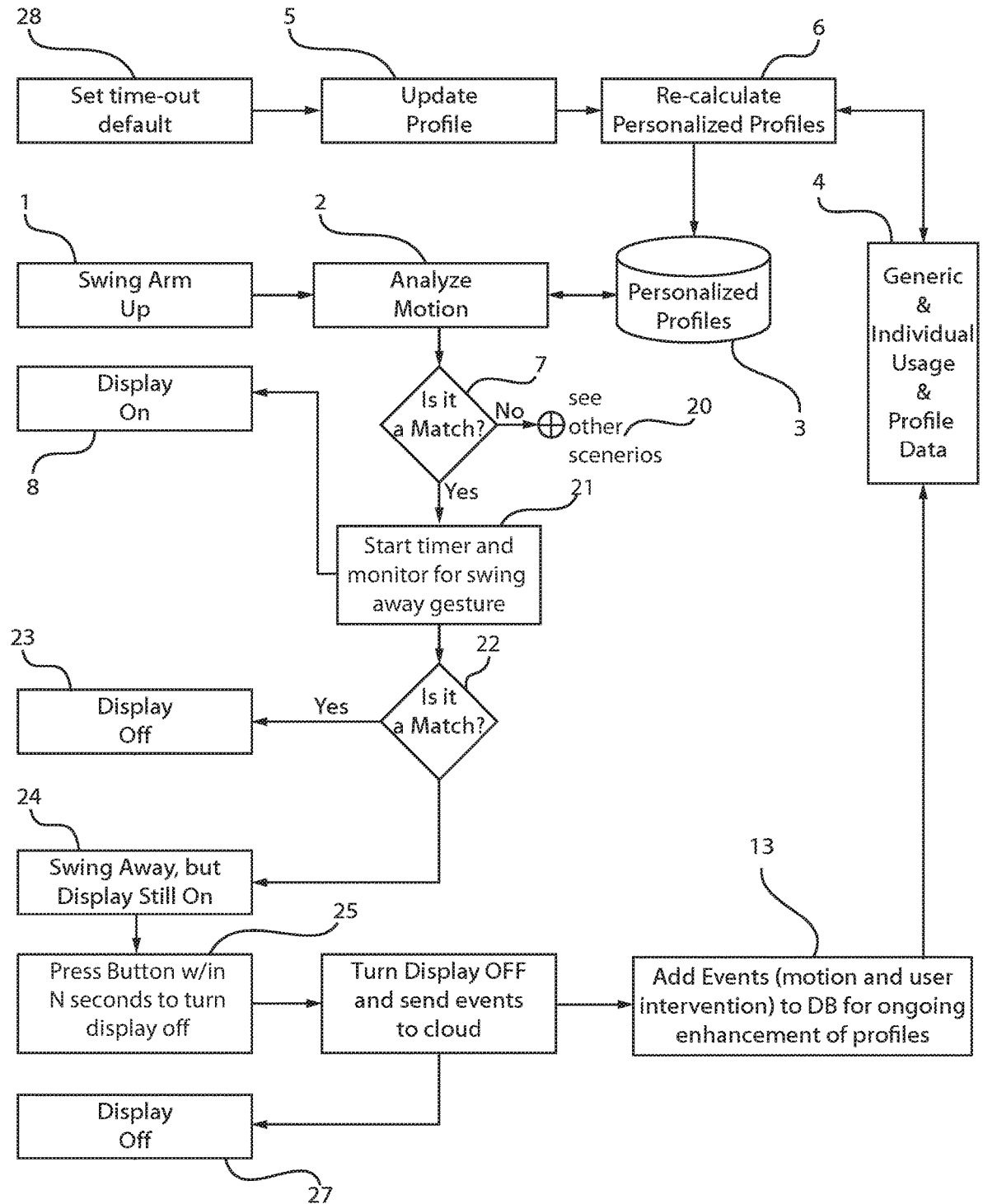
FIG. 4 is a flow diagram showing an embodiment of a method for controlling OFF switching for the display of wearable and/or mobile electronic device that includes measuring the motion of the device to determine whether the motions are recognized gestures from a database of OFF motions for turning the device, and an override including a selectable button for turning the display on in response to a motion that is not a recognized gesture from the database.

The motions in the database of motions may be gestures, such as raising your arm to a level of sight for the user to view a mobile electronic device that is affixed to the users wrist. For example, FIGS. 1-3 illustrate methods in which at least an upward motion of an arm, i.e., an arm to which the wearable device and/or mobile device is affixed, provides the command to change the display state of the mobile devices and/or wearable device to ON, and includes the ability to learn motions from the user that the user wishes to apply as commands to change the display state of the electronic device to an ON state. FIG. 4 illustrates one embodiment, of a methods in which at least a downward motion of an arm, i.e., an arm to which the wearable device and/or mobile device is affixed, provides the command to change the display state of the electronic device to OFF, and includes the ability to learn motions from the user that the user wishes to apply as commands to change the display state of the electronic device to OFF.

Figure 5A:
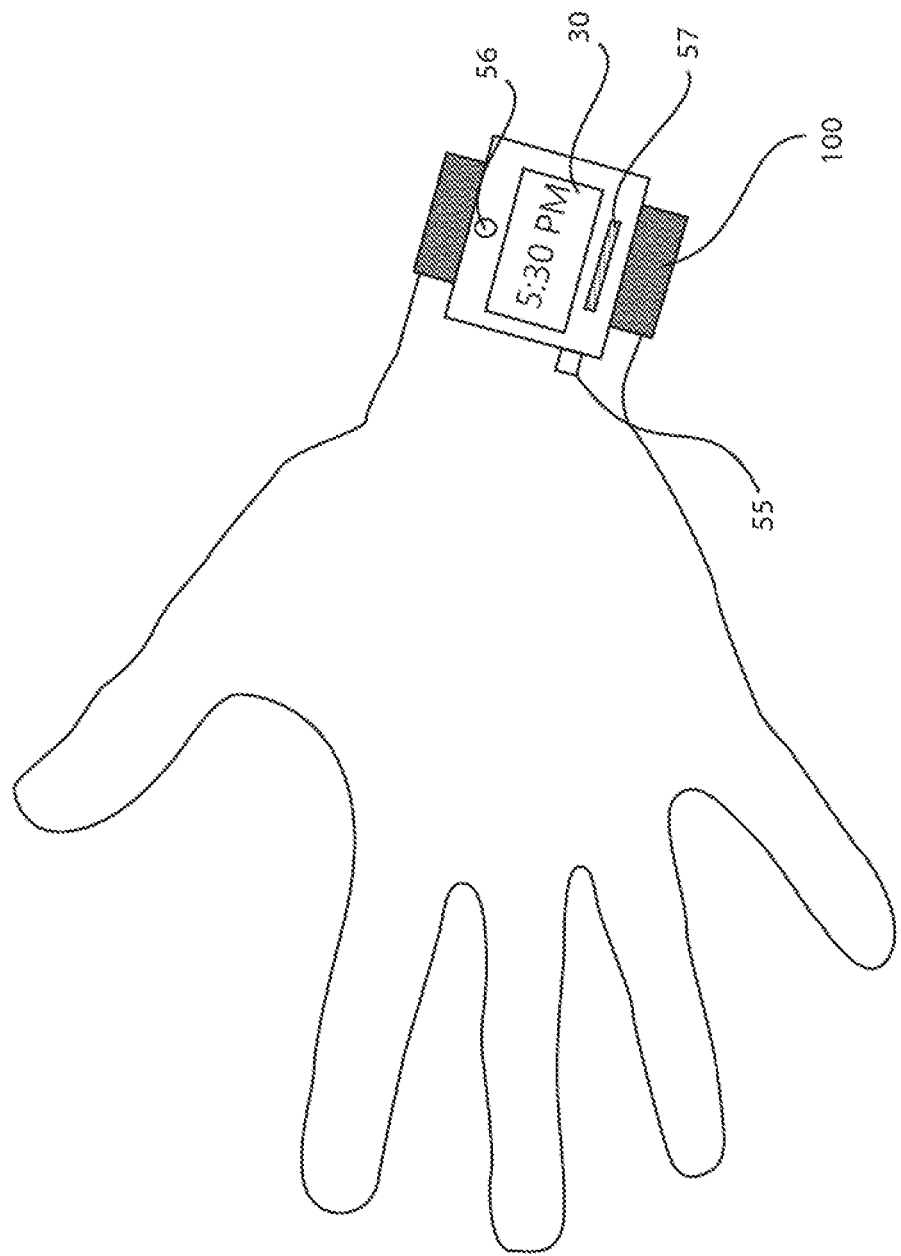
FIG. 5A is a schematic diagram depicting a wearable device that measures motions applied to the wearable device and correlates those motions to gestures for activating and deactivating display, in accordance with one embodiment of the present disclosure.

Referring to FIGS. 1 and 5A-6, in some embodiments, the method provides for controlling ON switching for the display of the wearable and/or mobile electronic devices that includes measuring the motion of the device to determine whether the motions are recognized gestures from a database of ON motions for turning the device ON, and an button override for turning the display ON in response to a motion that is not a recognized gesture from the database, wherein use of the button override also updates the database to include the motion as a gesture for turning the display ON. FIGS. 5A and 5B is a schematic of a wearable device is provided that measures motions applied to the wearable device 100 and correlates those motions to gestures for activating and deactivating a display 30 including a button override 55.

Referring to FIG. 1, in one embodiment, the method may begin with a user applying a motion, e.g., a swing of an arm in an upward motion, i.e., upward normal to the floor that the user is standing upon, at block 1 of the method. In the method depicted in FIG. 1, the display state begins in an OFF display state. This means that the display is not being powered. The electronic device may be powered, but the display is not being illuminated, and is hence in an OFF state. It is noted that arm motion is only one example, e.g., applicable to a wristwatch, but other motions are equally applicable.

The method continues at block 2 by analyzing the motion that was applied to the electronic device at block 1. Analyzing the motion includes the step of providing a database of motions that are correlated to display states. Analyzing the motion includes a sensor that is used to measure the motion of the electronic device, and at least one motion analyzing controller that receives the signal from the motion sensor. The at least one motion analyzing controller may be provided by a microprocessor employing logic transistors for actuating instructions, and memory having instructions for correlated motions to display commands that is present in the electronic device; or the at least one motion analyzing controller may be present in the cloud computing environment, in which the analysis provided by the cloud computing environment is communicated to the electronics device through communications modules that are contained within the electronics device.

Providing the database of motions includes personalized profiles for motions that are correlated to commands for switching the display between different display states. In some embodiments, the database of personalized profiles for motions are stored on memory, i.e., non-transistor memory, that is present within the electronics package of the electrical device to which the motion is being applied. In other embodiments, the personalized profiles are accessed through a cloud computing environment, in which the cloud computing environment is communicated to the electronics device through communications modules that are contained within the electronics device.

The personalized profiles can include motions specific to the user of the device, e.g., path and position of the watch during the motion. For example, when the motion is an upward swing of the arm, the arc along which the electronic device is traversed may be specific to the user, as well as the length of the arc. The acceleration of the electronic device along the arc is also a factor that may be specific to the user. The personalized profiles are not limited to only the movement of the device, but also other factors, such as whether the device is running a specific application at the time of the motion and/or whether the user is having an audio interaction with the device at the time of the motion.

The at least one motion analyzing controller first calls from the personalized profiles for motion at block 3 to determine if the motion applied to the electronic device at block 1 matches a motion of the device and the display state of the device at the time of motion match conditions in the database of motions, i.e., the personalized profiles for motion at block 3, that are correlated to display states that signal a change from the display state at the time of the motion to a called display state. The called display state is the display state that the display is being switched to. For example, in the method that is described with reference to FIG. 1, the display is being switched from an OFF display state before the application of the motion at block 1, to an ON display state following the motion, i.e., when the motion matches a motion of the device and the display state of the device at the time of motion that matches conditions in the database of motions, i.e., the personalized profiles for motion at block 3, that are correlated to display states that signal a change from the display state at the time of the motion to a called display state.

The personalized profiles at block 3 can be provided by cloud based analytics that are trained from user interventions in the usage data for the electronic device. For example, the personalized profile at block 3 can be provided by a learning loop that includes a generic and individual usage and profile data at block 4, an on board logic component of the electronic device that can call to re-fetch personalized profiles for the motion analyzing controller, and a step of recalculating, i.e., block 6, the personalized profiles taking into account changes in the generic and individual usage and profile data.

The generic and individual usage and profile data at block 4 may include generic movements intended to capture a majority of users that can operate the mobile device. In addition to the generic movements, the generic and individual usage and profile data can also include multiple movements specific to the user that have been saved in the generic and individual usage and profile date in response to a control override event. As will be described in further detail below, the generic and individual usage and profile data at block 4 may be updated in response to a control override, i.e., motion and user intervention. As will be further described below, if a motion that is applied to the electronic device does not match a motion of the device that is logged in the personalized profile that is correlated to a called display state, and the user of the device wishes for that motion to result in a change of display state, the user may add it to the generic and individual usage and profile data by activating an override/intervention function.

Referring to block 5, in some embodiments, in response to a timing event, such as a repeating calendar time period, e.g., a weekly interval and/or monthly interval, or a number of changes to the state of the display, e.g., a number of display switches from an ON state to OFF state ranging from 5 to 20, the on board logic component of the electronic device can call to re-fetch personalized profiles at block 5. In response to the re-fetch call, the personalized profiles can be updated and recalculated in response to changes in the generic and individual usage and profile data at block 6. The recalculating step at block 6, can provide for updating the personalized profiles at block 3 to provide the database of motions from which the at least one motion analyzing controller can compare measured motions of the electronic device to motions that are assigned to changes in display states, e.g., from an OFF display state to an ON display state. The calculations to update the personalized profiles may employ a cloud computing environment. In other embodiments, the calculations to update the personalized profiles may be performed locally in the electronics package of the mobile/wearable device.

Referring back to block 2, taking into account the personalized profiles, e.g., updated personalized profiles, the at least one motion analyzing controller determines whether the motion of the device and the display state of the device at the time of motion match conditions in the database of motions, i.e., personalized profiles, that are correlated to display states that signal a change from the display state at the time of the motion to a called display state. If the motions measured match a set of conditions in the database of motions, i.e., the personalized profiles, at block 7, the method may continue with turning the display to an ON display state at block 8. For example, at block 7, the power from a battery of the electronic display can be adjusted to effectuate a change of display state in response to the display state of the device at the time of the motion matches conditions in the database of motions that signal the change of display state, i.e., the change in display state from the original display state of OFF at the time of the motion being measured to the called display state of ON.

Referring back to block 7, if the motions measured do not match a set of conditions in the database of motions, i.e., the personalized profiles, the display state does not change, i.e, remains OFF at block 9. A movement measured by the motion sensor of the electronic device that does not signal a change in display state can begin a time period for user intervention for requiring a called display state, e.g., to turn the display state to ON. The timer period for user intervention may be a time period ranging from 5 seconds to 1 minute for actuating the mechanism by which the user may signal for a called display state.

Figure 5B:
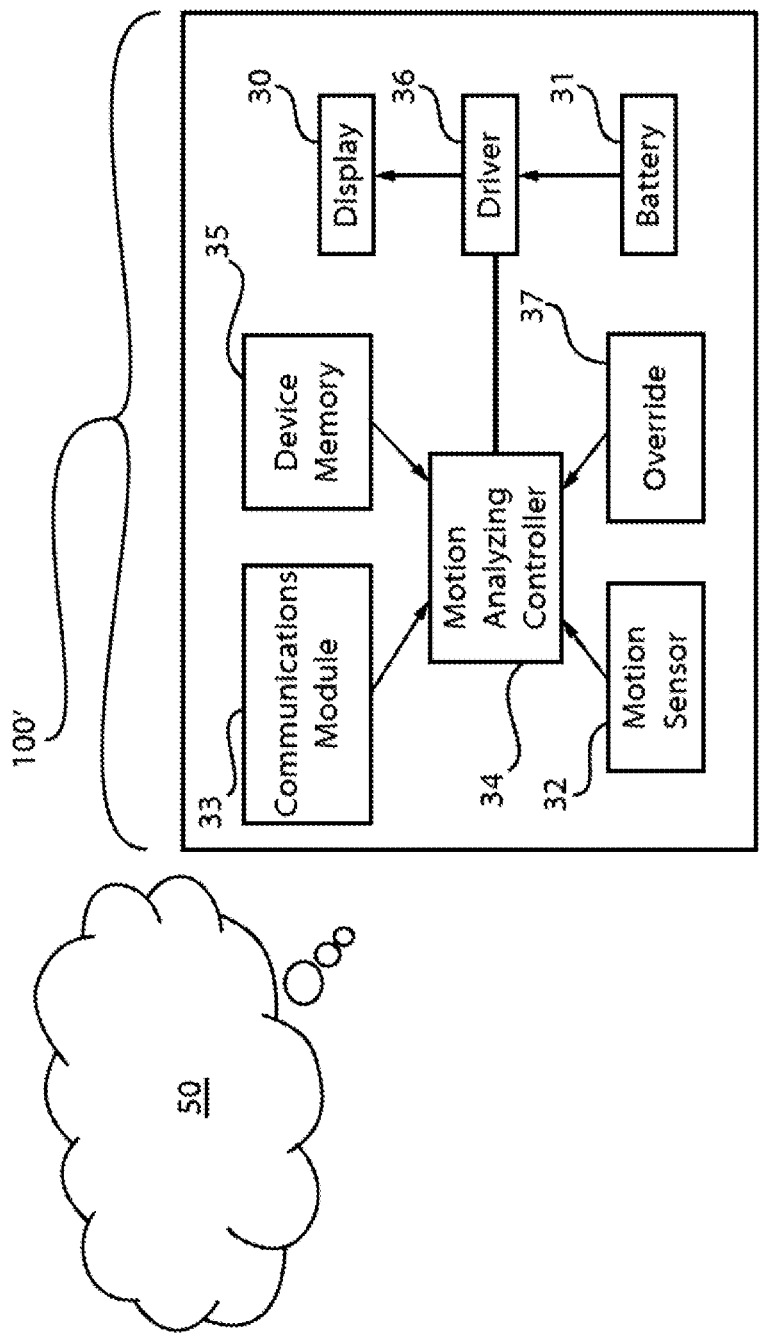
FIG. 5B is an view of the internal components of the wearable device of FIG. 5A.
Figure 6:
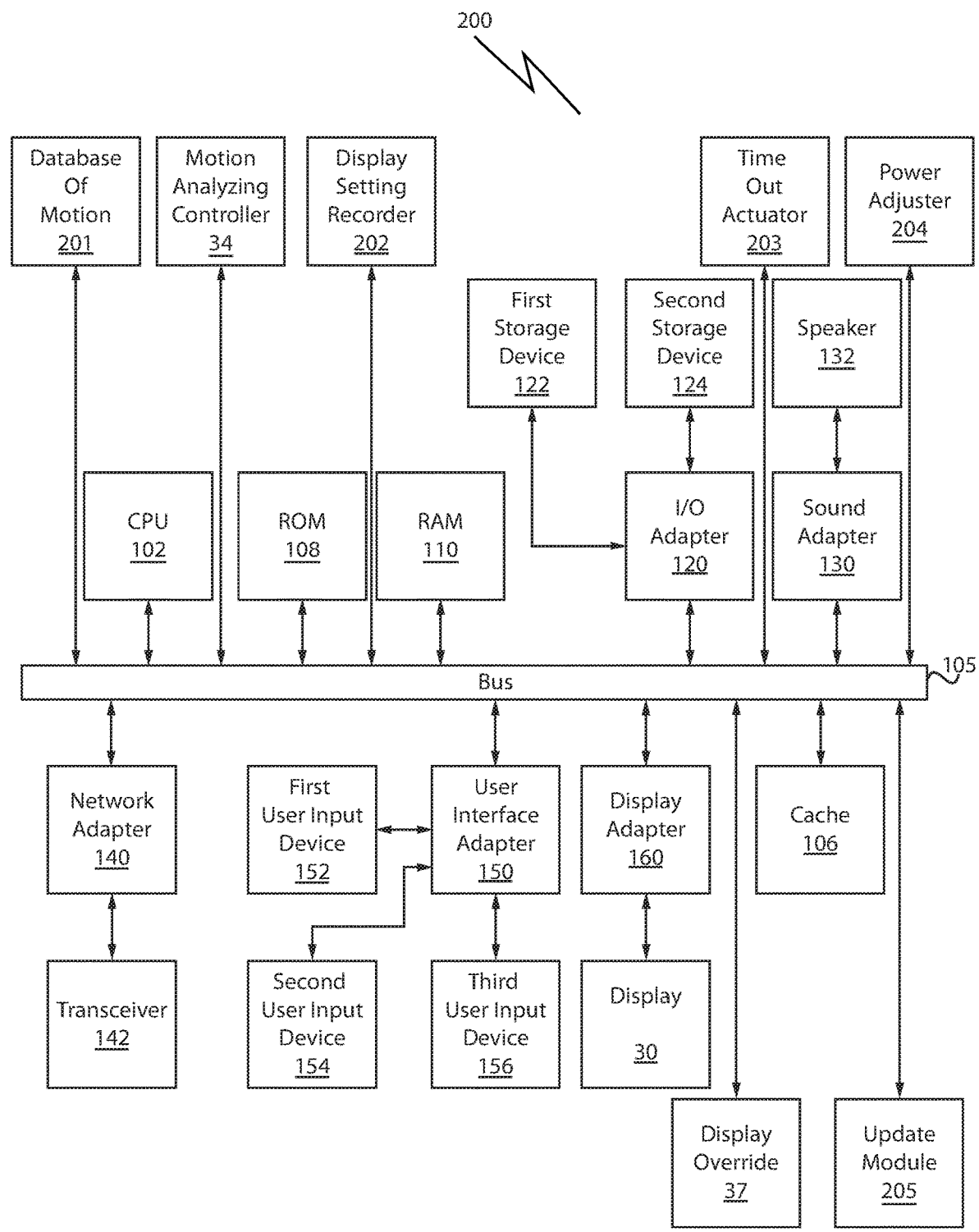
FIG. 6 is a block diagram illustrating one embodiment of a system for controlling on and off switching for the display of wearable and/or mobile electronic devices, in accordance with an embodiment of the present invention.

In a following step, the method can continue with updating the database of motions in response to changes in the display state when effectuated by the activation of the selectable button. In the embodiment that is depicted in FIG. 1, user intervention may include pressing a button 55, as depicted in FIGS. 5A-6, that is accessible on the outside of the electronic device, e.g., wristwatch, having a function that calls for a change in display state, at block 10. Referring to FIG. 1, a user pressing the button 55 within the time period of user intervention at block 10 can activate the display, i.e., power the display to a called display state of ON, at blocks 11 and 12. Powering the display for block 12 is similar to the step of powering the display for block 9. Therefore, the above description of powering the display for block 9 provides one example of powering the display for block 12.

Referring to FIG. 1, the step of activating the display in response to user intervention at block 11 also includes sending the events that the user wishes to trigger a call for a new display state to a cloud computing environment to update the generic and individual usage and profile date, i.e., add events, i.e., the motion measured that is applied to the electronic device, and the display state at the time of the motion applied to the electronic device, to the database for ongoing enhancement of the profiles at block 13. Block 13 in FIG. 1 illustrates one embodiment of the logic for teaching the system via a cloud and data analytics when the user has to intervene, e.g., by pressing a manual button 55, because his/her natural gestures is not recognized as a motion correlated to a command to call for a change in display state.

It is noted that if the time period for user intervention times out, e.g., terminates, the user may no longer call for a display state change that will also update the generic and individual usage and profile data without applying another motion to the electronic device at block 1. In some embodiments, a user pressing the button 55 may change a display state independent of the method depicted in FIG. 1 with respect to motions.

The method depicted in FIG. 1 is only one example of a method for controlling the display state of electronic devices, and the present disclosure is not limited to only this example. FIG. 2 is a flow diagram is a block/flow diagram showing another embodiment of a method for controlling ON switching for the display of wearable and/or mobile electronic devices that includes measuring the motion of the device to determine whether the motions are recognized gestures from a database of ON motions for turning the display ON, and an override including both a selectable button and a camera for detecting user eye contact for turning the display on in response to a motion that is not a recognized gesture from the database. It is noted that the method depicted in FIG. 2 is similar to the method that is described with reference to FIG. 1 with the exception that the method depicted in FIG. 2 includes a method sequence the employs a camera 56 within the electronic device, and user intervention to effectuate a signal to change a display state of the device by eye contact of the user with the camera. Because the method that is depicted in FIG. 2 is similar to the method that is depicted in FIG. 1, each of the blocks that are described in FIG. 2 having a same reference number, i.e., block number, as the block depicted in FIG. 1, and described above, may employ the same description. The blocks identified by reference numbers 14, 15 and 16 in FIG. 2 directed to the use of the camera and eye contact by the users with the camera as a means of user intervention are now described in greater detail.

Referring to FIG. 2, beginning at block 7, if the motions measured do not match a set of conditions in the database of motions, i.e., the personalized profiles, the display state does not change, i.e, remains OFF. However, in the embodiment depicted in FIG. 2, the method may continue with block 14 that includes activating the camera 56 in the mobile devices and assessing whether the user is making eye contact with the camera 56. In some embodiments, the controller that analyzes whether the motion measured by the motion sensor of the electronic device matches a motion within the database of motions can also actuate the camera at block 14, can also analyze whether a user is making eye contact with the camera 56. In other embodiments, a controller separate from the controller that analyzes the motion measured by the motions sensor is used to actuate the camera, and determine whether a user is making eye contact with the camera at block 14. The controller may be present locally within the mobile device body, or can be provided in a cloud based computing environment.

Referring to block 15 of FIG. 2, in some embodiments, in which the motion applied to the electronic device does not turn the display on, and the user is making eye contact with the camera, the eye contact by the user is an example of user intervention that causes the display to turn ON at block 16. Powering the display for block 16 is similar to the step of powering the display for block 9. Therefore, the above description of powering the display for block 9 provides one example of powering the display for block 16.

Referring to block 15 of FIG. 2, in some embodiments, in which the motion applied to the electronic device does not turn the display ON, and the user is not making eye contact with the camera, the display remains in the OFF display state at block 16. Powering the display for block 16 is similar to the step of powering the display for block 1. Therefore, the above description of powering the display for block 9. It is noted that the method sequence may continue following block 9 in a manner similar to the method described with reference to FIG. 1. For example, the method depicted in FIG. 2 may continue at block 10, which includes user intervention to change display state by pressing a button 55, as depicted in FIGS. 5A-6, that is accessible on the outside of the electronic device, e.g., wristwatch, having a function that calls for a change in display state. The process sequence following block 10 in FIG. 2 is similar to the steps having similar reference numbers that are described with reference to FIG. 1.

Block 13 in FIG. 2 illustrates one embodiment of the logic for teaching the system via a cloud and data analytics when the user has to intervene, e.g., by pressing a manual button 55, because his/her natural gestures combined with eye tracking is not recognized as a command to call for a change in display state.

The method depicted in FIG. 2 is only one example of a method for controlling the display state of electronic devices, and the present disclosure is not limited to only this example. FIG. 3 is a flow diagram showing another embodiment of a method for controlling ON switching for the display of wearable and/or mobile electronic devices that includes measuring the motion of the device to determine whether the motions are recognized gestures from a database of ON motions for turning the display ON, and an override including both a selectable button 55 and a microphone 57 for detecting user voice intervention for turning the display on in response to a motion that is not a recognized gesture from the database.

It is noted that the method depicted in FIG. 3 is similar to the method that is described with reference to FIG. 1 with the exception that the method depicted in FIG. 2 includes a method sequence the employs a camera 56 within the electronic device, and user intervention to effectuate a signal to change a display state of the device by eye contact of the user with the camera. Because the method that is depicted in FIG. 2 is similar to the method that is depicted in FIG. 1, each of the blocks that are described in FIG. 2 having a same reference number, i.e., block number, as the blocks depicted in FIG. 1, and described above, may employ the same description. The blocks identified by reference numbers 17, 18, and 19 in FIG. 3 are directed to the use of a microphone, which is a component of the mobile device, and voice commands by the users as a means of user intervention are now described in greater detail.

Referring to FIG. 3, beginning at block 7, if the motions measured match a set of conditions in the database of motions, the display turns on at block 8. However, if the motions measured do not match a set of conditions in the database of motions, i.e., the personalized profiles, the method continues by activating the microphone of the mobile electronic device for receiving a voice command, which is depicted at block 17. A time period for voice intervention is then started. If within the time period for voice intervention, a voice command is not received by the microphone, the display remains in an OFF display state at block 18. If within the time period for voice intervention, a voice command is received by the microphone, such as "TURN ON", the display is turned ON at block 19. Further, the motions in combination with the voice command intervention, e.g., the statement by the user "TURN ON", can then be added to the database, i.e., add events (motion plus user intervention) to the database for ongoing enhancement of profiles at block 13. Block 13 illustrates one example of teaching the system by cloud and data analytics when the user has to intervene, e.g., by speaking a "WATCH ON" type command using the onboard microphone of a mobile electronic device, because his/her natural gesture was not recognized as a command to change the display state of the display. This update provides that the motion, which did not originally match a motion to call a change in display state, that preceded the audio intervention to change the display state is now added to the database of motions, and hereafter results in a display state change when the motion is performed by the user.

The process sequence following block 13 in FIG. 3 is similar to the block having similar reference numbers that are described with reference to FIG. 1.

FIG. 4 depicts one embodiment of a method for controlling OFF switching for the display of wearable and/or mobile electronic devices that includes measuring the motion of the device to determine whether the motions are recognized gestures from a database of OFF motions for turning the device, and an override including a selectable button for turning the display on in response to a motion that is not a recognized gesture from the database. The process flow depicted in FIG. 4 is similar to the process flow depicted in FIG. 1. For example, the process flow including blocks 1, 2, 3, 4, 5 and 6 that is depicted in FIG. 4 describes a method for changing a display state to ON by applying a motion to a mobile device, in which the motion applied to the mobile device is measured by a motion sensor within the device, and if the measured motion matches a motion with a database of motions that is correlated to a display change state. In the embodiment depicted in FIG. 4, the change in display state described with reference to blocks 1, 2, 3 and 8 is from an OFF display state to an ON display state. The process blocks having reference numbers 1, 2, 3, 4, 5 and 6 depicted in FIG. 4 have been described above with reference to FIG. 1.

In the embodiment depicted in FIG. 4 starting at block 7, when the motion (hereafter referred to as "first motion") applied to the electronic device matches a motion of the device and the display state of the device at the time of motion that matches conditions in the database of motions, i.e., the personalized profiles for motion at block 3, the display state is changed to an ON step at block 8, and a monitor is started at block 21 for measuring a second motion intended to change the display step back to an OFF state. FIG. 4 also includes the capability to include other methods of turning the display ON, such as the activation of the selectable button 55, voice commands, and eye contact based commands at block 20.

The monitor measures motions applied to the mobile device during a time period that is pre-set during a set time out default block 28. The set time out default block 28 is a step of the learning cycle for providing the personalized profiles at block 3. The time period that the monitor measures the second motion may range from 5 seconds to 5 minutes. It is noted that this time period is provided for illustrative purposes only, and is not intended to limit the present disclosure. The monitor for measuring the second motion may be the same motion analyzing controller that measures the first motion, and the second motion applied to the mobile device may be measured by the aforementioned motion sensor contained within the mobile device. In some embodiments, the monitor may be provided by a motion analyzing controller that is different from the motion analyzing controller that is used to measure the first motion. The second motion measured by the motion sensor is then compared with the database of motions, i.e., personalized profiles at block 3. If the second motion matches a motion within the database of motions that calls for a display state, the monitor can then signal for a display state change to display OFF at block 22. In the embodiment depicted in FIG. 4, the second motion applied to the mobile device by the user may be a swing away from the eyesight of the user. More specifically, the second motion may be applied when the mobile device, e.g., a wristwatch, is mounted to the arm, e.g., wrist, of a user, and the measuring of the second motion of the device includes a swing motion of the arm downward to a position away from viewing of the device by the user. In some embodiments, when the swing motion of the arm downward from the position for viewing matches the conditions in the database of motions that signal the change of display state, the method calls for adjusting power from the battery to the display to power OFF the display at block 23.

If there is no match between the swing motion, i.e., second motion, of the arm downward away from a position for viewing the device by the user and the conditions in the database of motions, the display remains in an ON state at block 24.

In some embodiments, a change of display state to an OFF display state may still be called by the user through user intervention by the activation of the selectable button 55 on the mobile device at block 25. This step is similar to the use of user intervention through the activation of a selectable button 55 of the mobile device as described in block 10 of FIG. 1. However, in step 10 of FIG. 1, the user intervention by the activation of the selectable button 55 on the mobile device results in turning the display to an ON state, while in block 25 of FIG. 4 activation of the selectable button 55 on the mobile device results in turning the display to an OFF state. Similar to the other embodiments employing user intervention through the use of a selectable button 55, the override provided by this function is to be activated within a specified time period, e.g., 5 seconds to 1 minute.

Referring to FIG. 4, in a sequence following the activation of the selectable button 55 at block 25, the method may continue with the step of depowering the display in response to user intervention at block 27, and can also include sending the events that the user wishes to trigger a call for a new display state, e.g., a call for an OFF display state in response to a new downward motion away from the users line of sight, to a cloud computing environment at block 26 to update the generic and individual usage and profile date for ongoing enhancement of the profiles at step 13. Bock 13 in FIG. 4 illustrates one embodiment of the logic for teaching the system via cloud and data analytics when the user has to intervene, e.g., by pressing a manual button 55, because his/her natural gestures is not recognized as a motion correlated to a command to call for a change in display state, e.g., a call for an OFF display state.

It is noted that if the time period for user intervention times out, e.g., terminates, the user may no longer call for a display state change that will also update the generic and individual usage and profile data without applying another motion to the electronic device at block 1. The method depicted in FIG. 4 is only one example of a method for controlling the display state of electronic devices, and the present disclosure is not limited to only this example.

It is noted that in each of the flow charts described with reference to FIGS. 1-4, the process flow may begin with a motion to be measured, and a process flow may end with a display state change, e.g., to display ON or display OFF. After any display state change, a process flow may restart with the next motion of the mobile/wearable device to be measured.

FIG. 5A is a schematic of a wearable device 100 is provided that measures motions applied to the wearable device 100 and correlates those motions to gestures for activating and deactivating display 30. In FIG. 5B, the out box identified by 100' depicts some of the internal components of the wearable device 100 that is depicted in FIG. 5A. In the embodiment depicted in FIGS. 5A and 5B, the wearable device is a wristwatch. However, this is only an example embodiments, and any mobile and/or wearable device is suitable for the methods, structures, systems and computer program products described herein. For example, the wearable device may include wristband, a neck lanyard, a clothing mounted device, a belt mounted device, a footwear mounted device and combinations thereof. The wearable device 100 may include a display screen 30 having at least two display states, e.g., an ON display state, and an OFF display state. The display screen 30 may be provided by any display type, such as a liquid crystal display (LCD), light emitting diode (LED) display, organic light emitting diode (OLED), as well as other types of displays typically employed in electronic devices that are employed as wearable devices and/or mobile devices.

The wearable device 100 may include a power source for powering the display screen 30 to effectuate change between the at least two display states. The power source may be a battery 31 that may be a lithium ion battery, a nickel cadmium (NiCd) battery, a nickel-metal hydride (NiMH) battery, a lead acid battery, a lithium polymer battery or a combination thereof.

The wearable device 100 may also include a motion sensor 32 for measuring motion of the wearable device. The motion sensor 32 may be an accelerometer, a gyroscopic sensor, a 3-dimensional (3D) depth sensor, a gravity sensor or a combination thereof. The wearable device 100 may also include a communications module 33 for accessing a database of motions that are correlated to display states of the electronic device 100. For example, at least one of the database of motions, e.g., personalized profiles of block 3 of the methods described with reference to FIGS. 1-4, and/or generic and individual usage and profile data at block 4, may be provided by a cloud computing environment 50, and the wearable device may communicate with the cloud computing environment via the communications module 33. In another example, at least one of the database of motions, e.g., personalized profiles of block 3 of the methods described with reference to FIGS. 1-4, and/or generic and individual usage and profile data at block 4, may be provided by a device memory 35 within the electronics package of the mobile and/or wearable device 100.

In some embodiments, the wearable device 100 includes a motion analyzer controller 34 for comparing the motion of the wearable device 100 to the database of motions that are correlated to a display state of the display screen 30 of the electronic device, as described with reference to blocks 2, 7, 21 and 22 of FIGS. 1-4. In some embodiments, the motion analyzer controller 34 can include at least one microprocessor, i.e., a computing device, that present can be present in an integrated circuit that can be is dedicated to perform tasks and execute specific applications, such as the comparison of measured motions and motions within a database that are correlated display states to determine the existence between measured motions and database motions. In addition to the processor, i.e., hardware processor, the motion analyzer controller 34 can contain memory, as well as programmable input/output peripherals. The memory of the motion analyzer controller 34 can include instructions for determining matches between measured motions and database motions.

In some embodiments, when the motion sensor 33 is a gyroscope, the gyroscopic sensor may measure the rate of rotation of the mobile and/or wearable device 100 as a vector, such as a vector $\vec{R}$, such that $\vec{R} = \langle R_x, R_y, R_z \rangle$, where each component is the rate of rotation around an inertial axis (x, y or z axis) of the device, in terms of radians per second (rad/s); and the motion analyzer controller 34 can employ these vectors to determine whether measured motions applied to the motion sensor match motions within the databases that are correlated to display changes. In some embodiments, when the motion sensor 33 is an accelerometer, the accelerometer can detect linear motion of the mobile and/or wearable device 100 along the three axis, i.e., X-X, Y-Y, and Z-Z. Such measurements may be denoted as a vector $\vec{L}$ along each of the axes (X-X, Y-Y, Z-Z) of device 100, such that $\vec{L} = \langle L_x, L_y, L_x \rangle$. For example, each vector may be unconstrained and measured in m/s². The motion analyzer controller 34 can employ these vectors to determine whether measured motions applied to the motion sensor match motions within the databases that are correlated to display changes.

FIGS. 5A-5B further depicts that the mobile and/or wearable device 100 includes a driver 34 for adjusting power from the power source, i.e., battery 31, to the display 30 to effectuate a change of display state in response to a signal received from the motion analyzer controller 34 indicating the motion of the device 100 and the display state of the device 100 at the time of the motion matches conditions in the database of motions that signal the change of display state, as described in blocks 8, 9, 12, 18, 19, 23 and 27. The driver 34 may include circuitry to control voltage and current from the battery 31 to the display 30. The driver 34 may be response to commands from the motion analyzer controller 34.

In one embodiment, the mobile and/or wearable device 100 includes a display override 37 that is in communication with the motion analyzer controller 34, in which the display override 37 can signal the motion analyzer controller to make a display state change. The display override 37 can be activated by at least one of a selectable button 55 that is present on a housing of the wearable device, a camera 56 within the display of the wearable device 100 detecting eye contact by the user, an audio microphone 57 or a combination thereof. In some embodiment, the display override updates the database to include the motion correlated to the user via the communications module.

FIG. 6 is a block diagram illustrating one embodiment of a system 200 for controlling on and off switching for the display of wearable and/or mobile electronic devices 100, 100'. It is noted that at least some of the components with the system depicted in FIG. 6 may be incorporate into the mobile and/or wearable device depicted in FIGS. 5A-5B, and vice versa. FIG. 6 depicts a system 200 including a database of motions 201 that are correlated to display states of the mobile and/or wearable electronic device. The database of motions 201 may be provided by any type of memory. In some examples, at least one element, of the database of motions 201 is provided in a cloud computing environment. The database of motions 201 may provide at least one of the personalized profiles at step 3 and the generic and individual usage and profile data at step 4. The system 200 that is depicted in FIG. 6 may also include a motion sensor 37 for measuring motion of the electronic device including the display, which is described in further detail with reference to FIG. 6.

Referring to FIG. 6, the system 200 may further include a display setting recorder, which may be composed of at least one module of memory, for determining a display state of the electronic device at the time of the motion being measured by the motion sensor 37, as blocks 1 and 21 of FIGS. 1-4. The motion analyzer controller 37 for determining if the motion of the device and the display state of the device at the time of motion match conditions in the database of motions that are correlated to display states that signal a change from the display state at the time of the motion to a called display state. The motion analyzer controller 37 has been described with greater detail with reference to FIG. 6, and can provide the functions of blocks 2, 7, 21 and 22 of FIGS. 1-4. The display override actuator 37 for signaling a display state change by user intervention may include a selectable button 55, a microphone 57 and/or a camera 56. The function of the override actuator has been further described with reference to blocks 10, 11, 14, 17 and 25 of FIGS. 1-4. Still referring to FIG. 6, the system may include a time out actuator 203, which can include a timer and/or counter, for signaling end of time period for display state change requests at steps 10, 17 and 25 of FIGS. 1-4.

Figure 7:
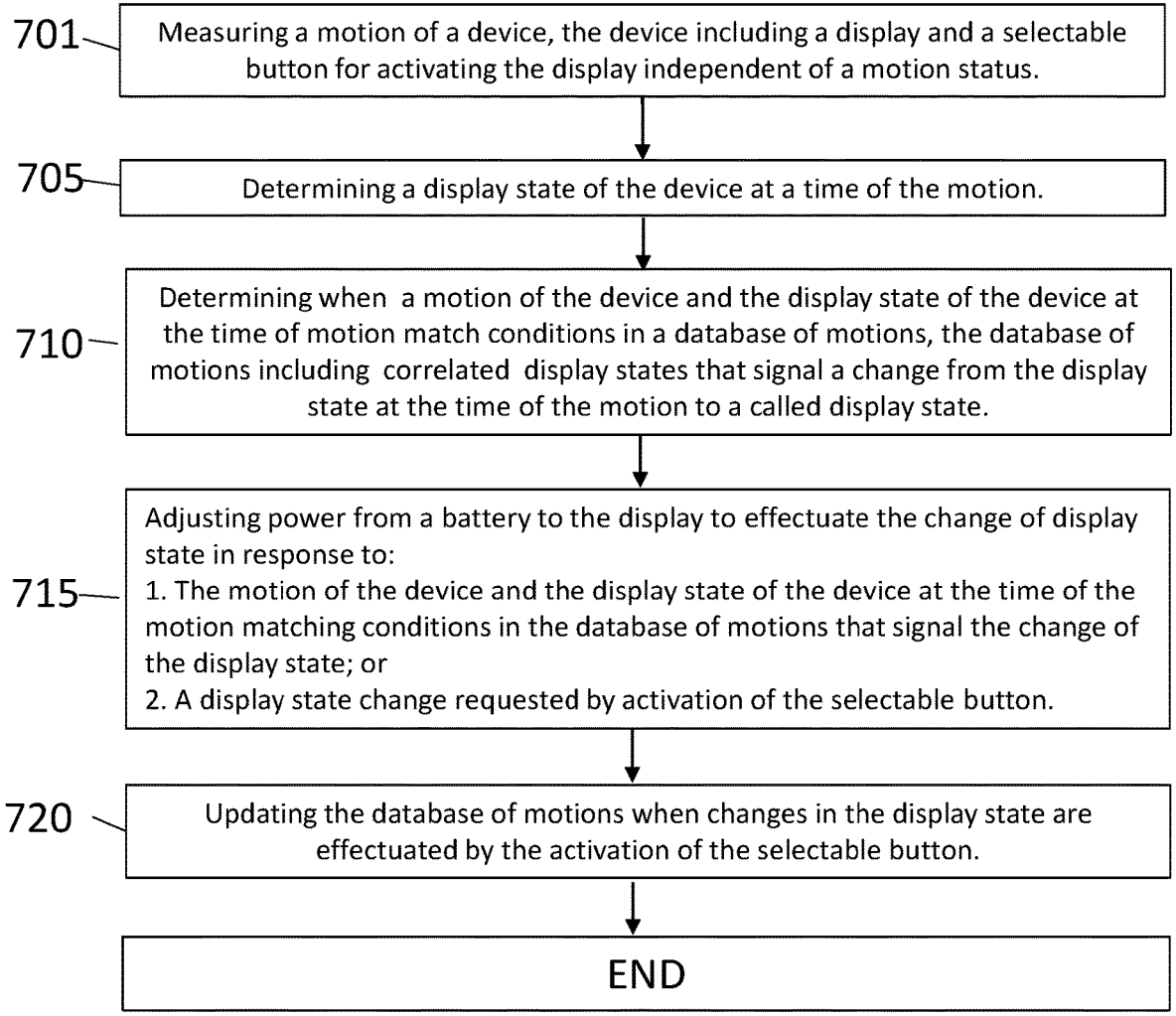
FIG. 7 is a flow diagram showing one embodiment of a method for controlling ON switching for the display of wearable and/or mobile electronic devices.

Referring to FIG. 7, a power adjuster 204 can include a driver for adjusting power to the display 30 from the battery 31 to effectuate a change of display state in response to a signal received from the motion analyzer controller 34 indicating the motion of the device and the display state of the device at the time of the motion matches conditions in the database of motions that signal the change of display state, the display override actuator 37 indicating a display state change requested by activation of the selectable button, or the time out actuator 203 indicating termination of a time period for changes in display state.

In some embodiments, the system may further include an update module 205 for updating the database of motions in response to changes in the display state effectuated by the activation of the display override actuator 37, e.g., selectable button 55. In some embodiments, the update module 205 can include at least one microprocessor, i.e., a computing device, that present can be present in an integrated circuit that can be is dedicated to perform tasks and execute specific applications, such as update the database of motions 201. Further details regarding the function of the update module 205 is provided by the description of blocks 11, 13, and 26.

In some embodiments, the database of motions 201, the motion analyzing controller 34, the display setting recorder 202, the time out actuator 203, the power adjuster 204, the display override 37 and the update module 205 of the system 200 are operatively coupled to each other and other components, such as at least one processor (CPU) 104, via a system bus 105. A cache 106, a Read Only Memory (ROM) 108, a Random Access Memory (RAM) 110, an input/output (I/O) adapter 120, a sound adapter 130, a network adapter 140, a user interface adapter 150, a display 30 and a display adapter 160, are also operatively coupled to the system bus 105 of the system 200.

A first storage device 122 and a second storage device 124 are operatively coupled to system bus 105 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 105 by the sound adapter 130. A transceiver 142 is operatively coupled to system bus 105 by network adapter 140. A display 30 is operatively coupled to system bus 105 by display adapter 160.

A first user input device 152, a second user input device 154, and a third user input device 156 are operatively coupled to system bus 105 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 200.

FIG. 7 is a flow diagram showing one embodiment of a method for controlling ON switching for the display of wearable and/or mobile electronic devices. The blocks illustrated in FIG. 7 provides a generalized process sequence for the methods described with reference to FIGS. 1-4, as actuated by the systems described in FIGS. 5A and 6. In one embodiment, the method may begin with block 701 that includes measuring a motion of a device, the device including a display and a selectable button for activating the display independent of a motion status. Examples of the device have been described with reference to FIGS. 5A-6. The measuring of the motions is described above with reference to block 2 in FIGS. 1-4. At block 705 the method continues with determining a display state of the device at a time of the motion. In some embodiments, the method can continue with block 710 by determining when a motion of the device and the display state of the device at the time of motion match conditions in a database of motions, in which the database of motions includes correlated display states that signal a change from the display state at the time of the motion to a called display state. Determining whether the motion and the display state match conditions in the database has been described with reference to blocks 2, 3, 4 and 7 in FIGS. 1-4.

The method can continue at block 715 with adjusting power from a battery to the display to effectuate the change of display state in response to:

1. The motion of the device and the display state of the device at the time of the motion matching conditions in the database of motions that signal the change of the display state, e.g., as described in block 7 of FIGS. 1-4; and 2. A display state change requested by activation of the selectable button, e.g., as described in block 10 of FIGS. 1 and 2, and block 25 of FIG. 4.

In some embodiments, the method may continue with block 720 which includes updating the database of motions when changes in the display state are effectuated by the activation of the selectable button. One embodiment of this step has been described in block 13 of FIGS. 1-4. The method described in FIG. 7 may be embodied as a computer program product.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It is understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
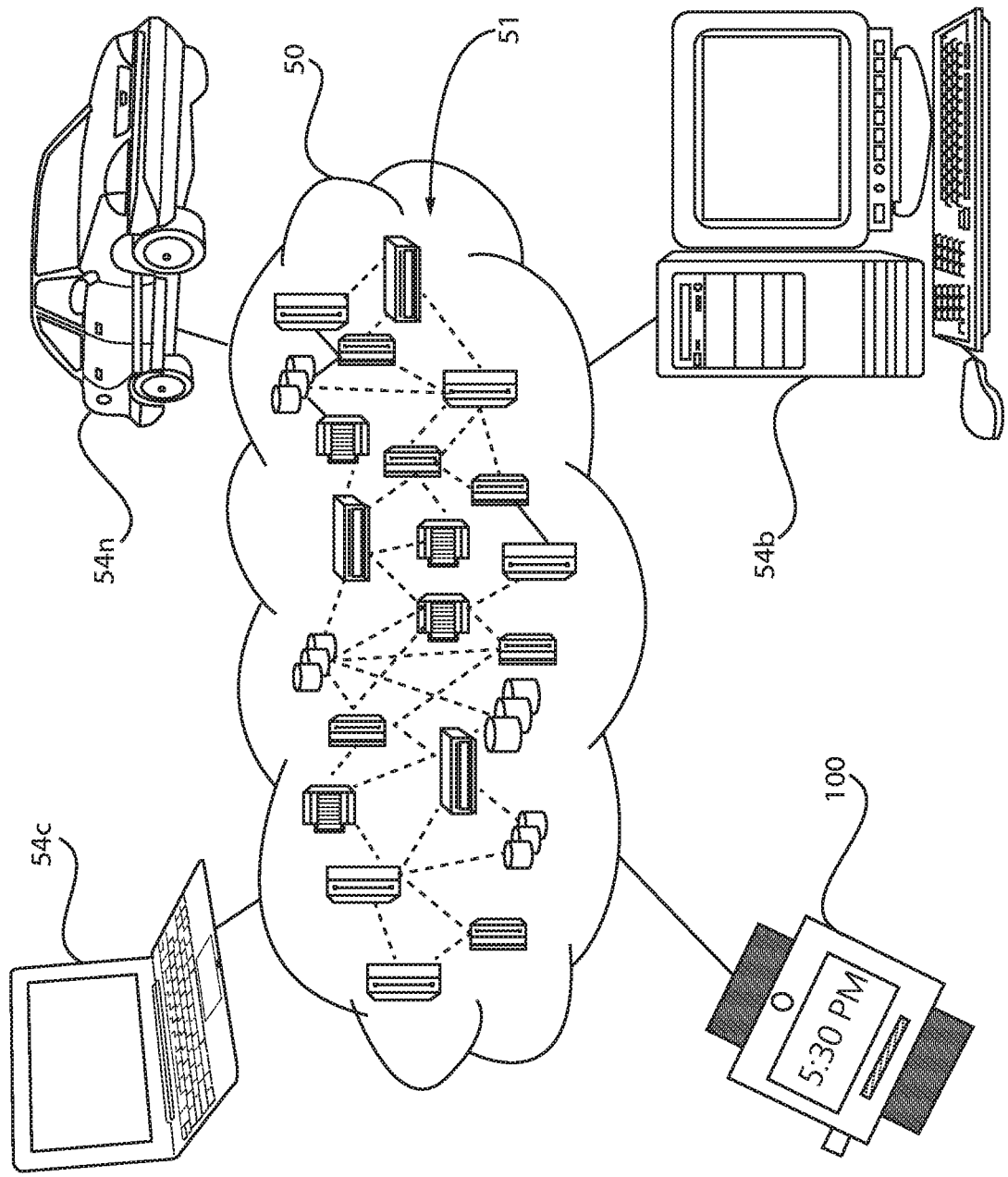
FIG. 8 depicts a cloud computing environment according to an embodiment of the present disclosure.

Referring now to FIG. 8, illustrative cloud computing environment 50 is depicted. As shown, cloud computing environment 50 includes one or more cloud computing nodes 51 with which local computing devices used by cloud consumers, such as, for example, mobile and/or wearable electronic devices 100, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 51 and cloud computing environment 50 can communicate with any type of computerized device over any type of network and/or network addressable connection (e.g., using a web browser).

Figure 9:
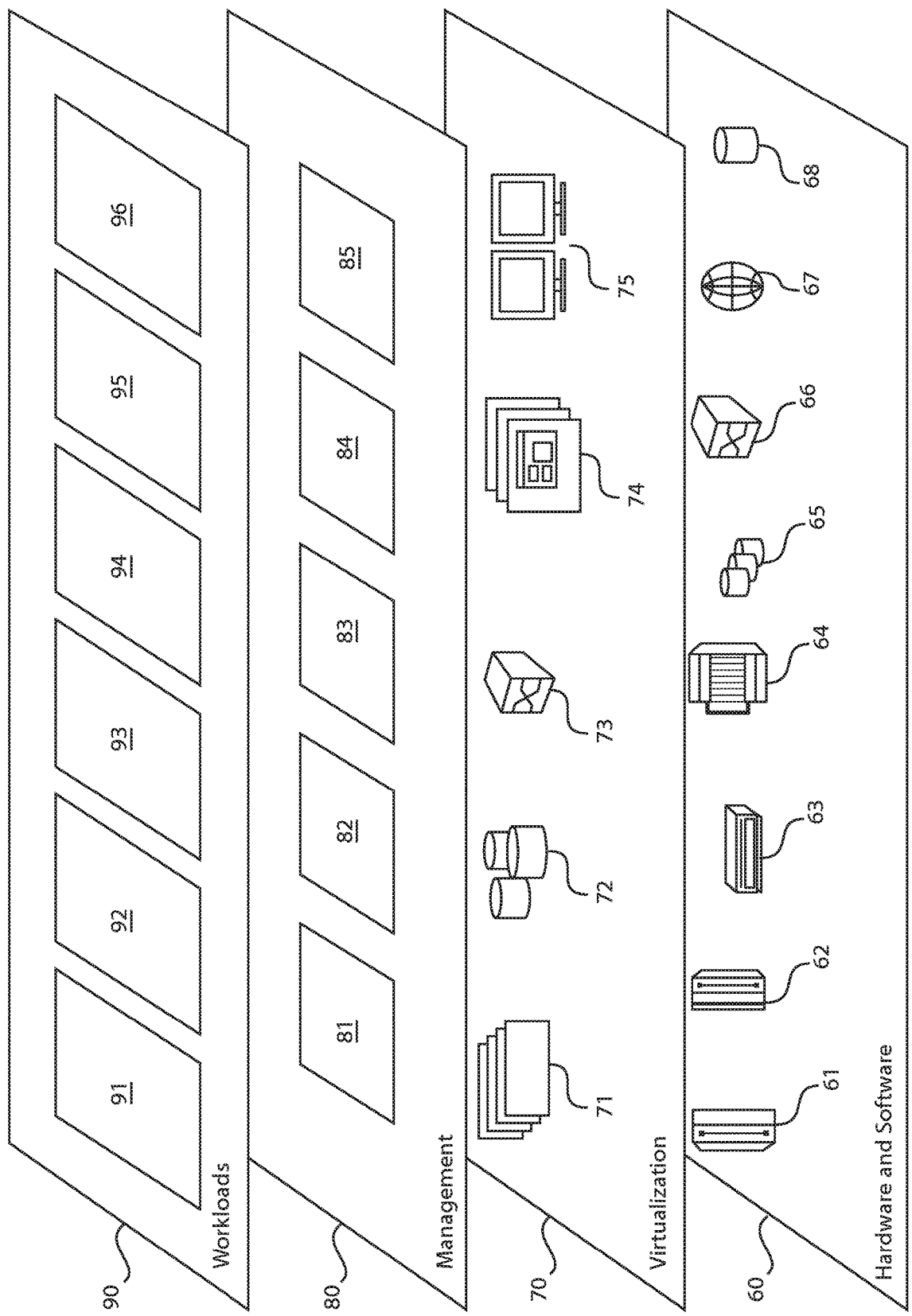
FIG. 9 depicts abstraction model layers according to an embodiment of the present disclosure.

Referring now to FIG. 9, a set of functional abstraction layers provided by cloud computing environment 50 (FIG. 7) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and display state change in response to at least motion commands applied to a mobile and/or wearable device 96. The display state change in response to at least motion commands applied to a mobile and/or wearable device 96 includes the methods described with reference to FIGS. 1-4.

Having described preferred embodiments of an intelligent display ON/OFF switching for electronic device displays (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method of controlling a display state of electronic devices comprising:
   measuring a motion of a device, the device including a display and a selectable button for activating the display independent of a motion status;
   determining a display state of the device at a time of the motion;
   determining when a motion of the device and the display state of the device at the time of motion match conditions in a database of motions, the database of motions including correlated display states that signal a change from the display state at the time of the motion to a called display state;
   adjusting power from a battery to the display to effectuate the change of display state in response to the motion of the device and the display state of the device at the time of the motion matching conditions in the database of motions that signal the change of the display state, or a display state change requested by activation of the selectable button when said motion does not match the motion matching conditions in the database of motions, and
   updating the database of motions when changes in the display state are effectuated by the activation of the selectable button, wherein said motion that does not match the motion matching conditions in the database of motions is added to the database of motions to signal a called display state.

2. The method of claim 1, wherein adjusting power from the battery to the display state follows a termination of a time period for changes in the display state.

3. The method of claim 1, wherein the display state change requested by activation of the selectable button is requested after a motion is measured that does not match conditions in the database of motions that are correlated to display states.

4. The method of claim 1, further comprising a display state change requested by eye contact with a camera within the device.

5. The method of claim 1, wherein the device is mounted to the arm of a user, said measuring the motion of the device comprises a swing motion of the arm upward to a position for viewing said device by the user.

6. The method of claim 5, wherein the display state at the time of the motion is display off, and the called display state is display on, wherein the swing motion of the arm upward to the position for viewing matches the conditions in the database of motions that signal the change of display state and results in said adjusting power from the battery to the display to power on the display.

7. The method of claim 5, wherein the swing motion of the arm upward to a position for viewing said device by the user does not match the motion matching conditions in the database of motions, and the display state change requested by the activation of the selectable button results in said adjusting power from the battery to the display to power on the display, wherein the swing motion of the arm is added to the database of motions to signal a called display state of on.

8. The method of claim 1, wherein said database of motions is saved in a cloud computing environment.

9. The method of claim 1, wherein the device is mounted to the arm of a user, said measuring the motion of the device comprises a swing motion of the arm downward to a position away from viewing said device by the user.

10. The method of claim 9, wherein the display state at the time of the motion is display on, and the called display state is display off, wherein the swing motion of the arm downward to the position for viewing matches the conditions in the database of motions that signal the change of display state and results in said adjusting power from the battery to the display to power off the display.

11. The method of claim 9, wherein the swing motion of the arm upward to a position for viewing said device by the user does not match the motion matching conditions in the database of motions, and the display state change requested by the activation of the selectable button results in said adjusting power from the battery to the display to power off the display, wherein the swing motion of the arm is added to the database of motions to signal a called display state of off.

12. A system for controlling the display state of an electronic device comprising:
   a database of motions that are correlated to display states of an electronic device;
   a motion measuring sensor for measuring motion of the electronic device including the display;
   a display setting recorder for determining a display state of the electronic device at the time of the motion;
   a motion analyzer for determining if the motion of the device and the display state of the device at the time of motion match conditions in the database of motions that are correlated to display states that signal a change from the display state at the time of the motion to a called display state;
   a display override actuator for signaling a display state change requested by activation of a selectable button on the electronic device;
   a time out actuator for signaling end of time period for display state change requests;
   a power adjuster for adjusting power to the display to effectuate a change of display state in response to a signal received from the motion analyzer indicating the motion of the device and the display state of the device at the time of the motion matches conditions in the database of motions that signal the change of display state, the display override actuator indicating a display state change requested by activation of the selectable button when said motion does not match the motion matching conditions in the database of motions, or the time out actuator indicating termination of a time period for changes in display state; and
   an update module for updating the database of motions in response to changes in the display state effectuated by the activation of the selectable button, wherein said motion that does not match the motion matching conditions in the database of motions is added to the database of motions to signal a called display state.

13. The system of claim 12, wherein the display state change signaled by the display override actuator occurs after a motion is measured that does not match conditions in the database of motions that are correlated to display states and a user choice of the motion to effectuate a display state change, wherein the update module updates the database to include the motion correlated to the user.

14. The system of claim 12, further comprising an eye contact sensor for signaling a display state change requested by eye contact with a camera within the device.

15. A wearable device comprising:
- a display screen having at least two display states;
- a power source for powering the display screen to effectuate change between the at least two display states;
- a motion sensor for measuring motion of the wearable device;
- a communications module for accessing a database of motions that are correlated to display states of an electronic device;
- a motion analyzer for comparing the motion of the wearable device to the database of that are correlated to a display state of the display screen the electronic device that the time of the motion measured by the motion sensor;
- a driver for adjusting power from the power source to the display to effectuate a change of display state in response to a signal received from the motion analyzer indicating the motion of the device and the display state of the device at the time of the motion matches conditions in the database of motions that signal the change of display state; and
- a display override indicating a display state change requested by activation of the selectable button in response to a user specific motion that does not correspond to the conditions in the database of motions that signal the change of display state, wherein the display override updates the database to include the motion correlated to the user via the communications module.

16. The wearable device of claim 15, wherein the wearable device includes selected from the group consisting of a wearable device including a wristband, a neck lanyard, a clothing mounted device, a belt mounted device, a footwear mounted device and combinations thereof.

17. The wearable device of claim 15, wherein the motion measured by the motion sensor is an upward arm movement that is correlated to the database of motions to turning on the display screen.

18. The wearable device of claim 15, wherein the motion measured by the motion sensor is an downward arm movement away from the user field of vision that is correlated to the database of motions to turning off the display screen.

19. The wearable device of claim 15, wherein the display override is activated by at least one of a selectable button that is present on a housing of the wearable device, and a camera within the display of the wearable device detecting eye contact by the user.

20. The wearable device of claim 15, wherein the database is in a cloud computing environment, a memory component of the wearable device or combination of the cloud computing environment and the memory component of the wearable device.

* * * * *